United States Patent
Iverson et al.

[11] Patent Number: 5,960,670
[45] Date of Patent: *Oct. 5, 1999

[54] ACTUATOR FOR GEAR TRANSFER CASE WITH CUSHION AT END OF TRAVEL

[75] Inventors: Anthony Iverson, Monroe; Ronald L. Merckling, Macomb Township, both of Mich.

[73] Assignee: Ut Automotive Dearborn, Inc., Dearborn, Mich.

[*] Notice: Under 35 U.S.C. 154(b), the term of this patent shall be extended for 82 days.

[21] Appl. No.: 08/571,156

[22] Filed: Dec. 12, 1995

[51] Int. Cl.$^6$ ..................................................... F16H 59/00
[52] U.S. Cl. ........................... 74/337.5; 74/526; 180/233; 180/247
[58] Field of Search .................................. 74/335, 337.5, 74/526; 180/233, 247

[56] References Cited

U.S. PATENT DOCUMENTS

| | | | |
|---|---|---|---|
| 4,664,217 | 5/1987 | Welch et al. . | |
| 4,805,472 | 2/1989 | Aoki et al. ................................... | 74/335 |
| 4,841,793 | 6/1989 | Leigh-Monstevens et al. ........... | 74/335 |
| 4,843,901 | 7/1989 | Peterson et al. ............................ | 74/335 |
| 5,150,637 | 9/1992 | Ninomiya et al. .......................... | 74/335 |
| 5,407,024 | 4/1995 | Watson et al. . | |
| 5,409,429 | 4/1995 | Showalter et al. . | |
| 5,469,757 | 11/1995 | Buhl et al. ................................. | 74/526 |

*Primary Examiner*—John A. Jeffery
*Assistant Examiner*—David Fenstermacher
*Attorney, Agent, or Firm*—Howard & Howard

[57] ABSTRACT

A vehicle transfer case for movement between two- and four-wheel drive includes a stop cushion as an end of travel range is approached. The cushion is preferably provided by a generally U-shaped spring that is contacted by the stop at either of its ends of travel. The cushion prevents the stop from locking into a housing for the gear.

20 Claims, 2 Drawing Sheets

ACTUATOR FOR GEAR TRANSFER CASE WITH CUSHION AT END OF TRAVEL

BACKGROUND OF THE INVENTION

This Application relates to a transmission for driving a vehicle transfer case actuator wherein a cushion is provided for a stop which prevents movement of the transmission beyond desired ends of travel.

In the prior art, transfer cases allow vehicles to be switched between two-wheel and four-wheel drive modes of operation. In addition, transfer cases typically allow both high and low gear ratios in both two- and four-wheel drive modes.

It has been standard that an actuator assembly moves shift collars between locations to drive one or two axles and engage either the high or low gear ratios. The actuator assembly has typically included a motor driving a worm. The worm engages a worm gear, and a shaft is driven by the worm gear. An actuator pin is driven by the shaft between several positions at which the various drive modes are obtained.

In one example, the worm drives the worm gear through a range of approximately 270°. A groove in the driven shaft moves an actuator pin between any one of four distinct axial positions. In the distinct axial positions, the actuator pin moves shift collars between locations wherein one axle or two axles are driven, and also between high and low gear ratios. Thus, by selectively rotating the worm gear, one can move the actuator pin to a desired location and achieve a particular drive mode. The motor is preferably a reversible motor such that the pin can be moved back and forth between the positions.

Problems have arisen in the prior art with such transmission. In particular, it would be undesirable to allow the shaft to rotate 360°. Such rotation could lock the transfer case members and prevent movement of the shift collars or actuator pin. To that end, stops have typically been provided on the worm gears to prevent rotation from approaching 360°. In one prior art example, a stop pin extends axially from a face of the worm gear and contacts a stop surface within the worm gear housing. In this way, the stop pin prevents the gear from even approaching 360° of rotation.

In the prior art systems, a smaller degree of angular motion is typically required to achieve the required movement of the actuator pin. In theory the worm gear should never approach the extremes of the stop. As one example, in the prior art systems, only 270° of rotation is necessary to actuate or move the actuator pin, while the motor transmission has 330° of range. A position feedback sensor monitors the position of the worm gear and should stop rotation at the extremes of the 270° range. However, in practice it does happen that the motor occasionally moves beyond the 270° range. In such circumstances, without a stop, the motor would extend up to 360° of rotation. The motors typically incorporated into the use systems allow full rotation, as a limited rotation motor is unduly expensive. For that reason, the prior art has typically included a stop to prevent rotation beyond a greater range (i.e. 330° of rotation). Thus, as the transmission approaches 330° of rotation, the stop will prevent further rotation. In the past, the stop often wedges into the housing structure and locks the gear motor. Once this happens, the system is no longer functional.

SUMMARY OF THE INVENTION

In a preferred embodiment of this invention, a transmission for driving the actuator in a transfer case includes a worm gear driven by a worm. A stop on the worm gear is provided with a cushion as it approaches its end of travel, and before it hits the stop surface. Thus, the stop will not wedge into the housing, thus locking the worm gear. It is preferred that the worm gear drives a shaft including a groove that moves an actuator pin between selected axial positions. Movement of the actuator pin causes movement of corresponding shift collars to result in the selection of two-wheel or four-wheel drive, and also high and low gear ranges. The structure for achieving the two- and four-wheel drive and high and low ratios forms no portion of this invention, and is shown schematically in this Application.

In preferred embodiments of this invention, the stop contacts a spring which provides the cushion as it approaches its end of travel. In a most preferred embodiment the spring is generally U-shaped, and has sides extending from opposed circumferential locations such that it provides a stop cushion for the stop when moving in either rotational direction. In a most preferred embodiment, a housing for the worm gear includes a stop wall with a spring channel. The U-shaped spring is received in the channel with spring sides extending outwardly in both directions. The sides provide cushions as the stop approaches either end of travel. In this way, the stop is prevented from wedging into the wall thus locking the worm gear.

In a method according to the present invention, a cushion is provided to cushion a stop for a worm gear in a transfer case actuator as the worm gear approaches its end of travel. In a preferred method, the cushion is provided by a spring as described above.

These and other features of the present invention can be best understood from the following specifications and drawings, of which the following is a brief description.

DETAILED DESCRIPTION OF A PREFERRED EMBODIMENT

Figure 1:
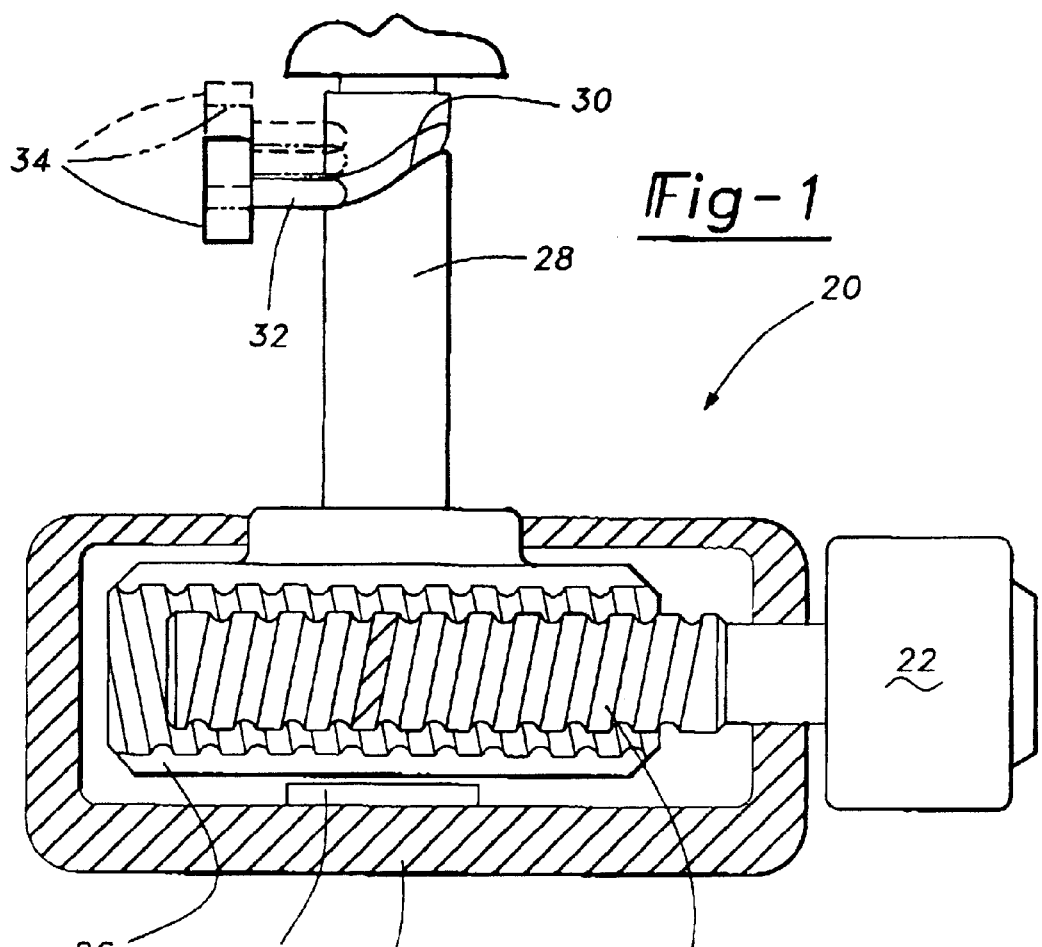
FIG. 1 is a schematic view of a transfer case actuation system.

A transfer case actuation system 20 is illustrated in FIG. 1. A motor 22, which may be a DC motor selectively drives a worm 24. Worm 24 engages teeth on a worm gear 26. Motor 22 is preferably reversible, and upon rotation of worm 24, the worm gear 26 rotates. Worm gear 26 drives a shaft 28. As shown schematically, shaft 28 may include a cam groove 30. Actuator pin 32 is received within cam groove 30. A shift collar system 34 is shown schematically being driven by pin 32. As known, upon rotation of the shaft 28, the cam groove 30 causes axial movement of pin 32, and thus movement of collar 34 between several axial positions. The positions are shown schematically in this Figure, and the structure of the groove 30, the pin 32, and the collar system 34 form no portion of this invention. Upon movement of the collar system 34 between the several positions, gearing is moved between two- and four-wheel drive positions, and also between high and low gear ratios. The rotation of the shaft 28 does not require 360° to achieve all of the required movement of the actuator pin 32. In fact, it would be undesirable to have 360° of rotation.

In the prior art, it is typical that only about 270° of rotation is required to achieve all movement of the actuator pin 32. The motor 22 typically can rotate through 360°. The transmission between worm 24 and worm gear 26 is such that the rotation is limited to prevent rotation through 360°, as such rotation would be undesirable. To that end, some stop has been provided in the prior art to prevent rotation of the worm gear 26 as it approaches about 330° of rotation. Typically, more rotation is allowed than is required by the 270° of rotation to move the pin 32 as necessary.

A position feedback member 35 is shown schematically, and monitors the movement of the worm gear 26. Position feedback member 35 is associated with the control for motor 22, and also for the overall transfer case system. A housing 36 receives the worm gear 26 and position feedback member 35.

In theory, position feedback member 35 should prevent rotation of worm gear 26 beyond the 270° of rotation necessary for operation of actuator pin 32. In practice, however, it sometimes occurs that the feedback position member 35 does not stop further rotation of worm gear 26. This has required the stop as utilized in the prior art. It should be understood that the 270° and 330° ranges are examples, and that the actual number may differ.

Figure 2:
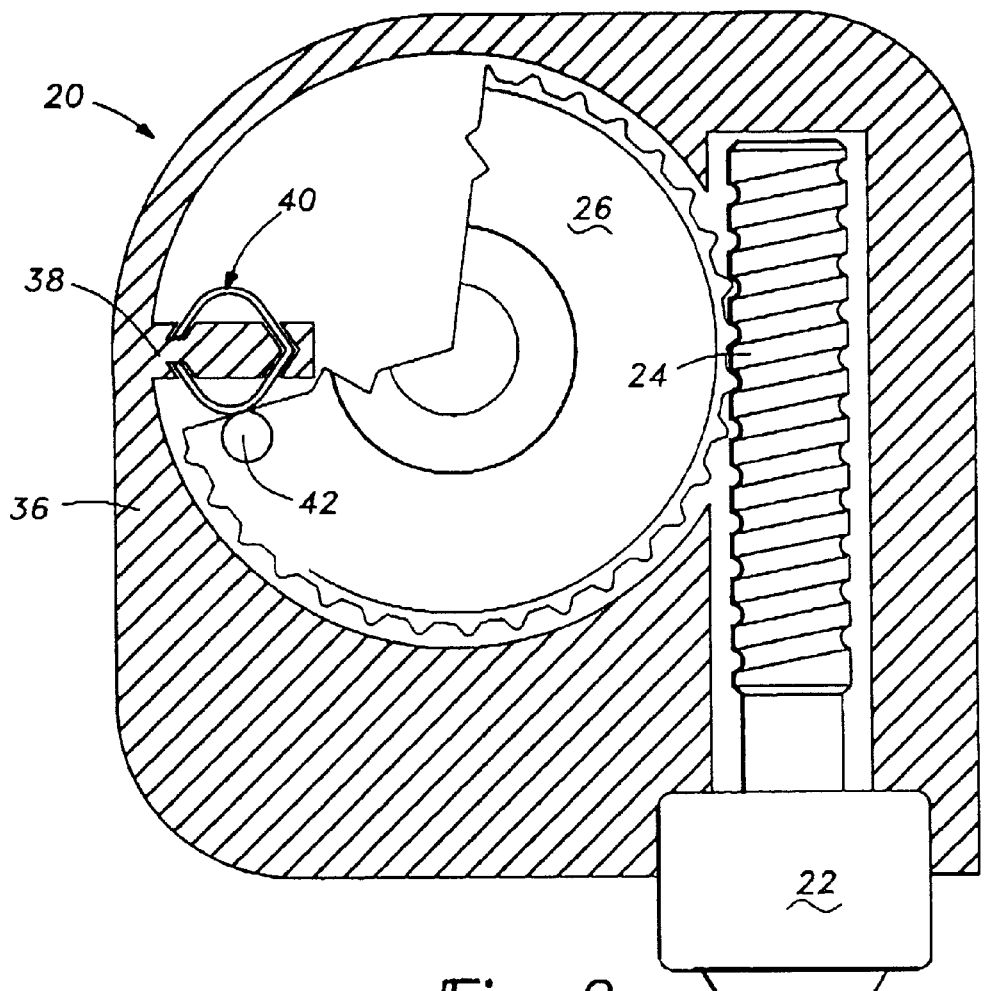
FIG. 2 is a top view of a housing for a worm gear in the system shown in FIG. 1.

As shown in FIG. 2, housing 36 also receives worm gear 26 and worm 24. A stop surface or wall 38 extends from a floor of housing 36. A stop cushion spring 40 is associated with stop surface 38, and provides a cushion for a stop member 42 that extends downwardly from a face of worm gear 26. The worm gear 26 is partially fragmented away to show the detail of surface 38 and spring 40. As worm gear 26 is rotated through the 330° of range of rotation by worm 24, stop 42 moves toward spring 40 as shown in FIG. 2. When worm 24 is rotated in the reverse direction, the stop 42 will rotate with the worm gear 26 through approximately 330° such that it contacts an opposed side of spring 40. The spring 40 provides a cushion for movement of the stop 42 as it approaches its ends of travel. As such, the stop 42 is not wedged into the stop surface 38 such that it may lock further rotation of the worm gear 26.

Figure 3:
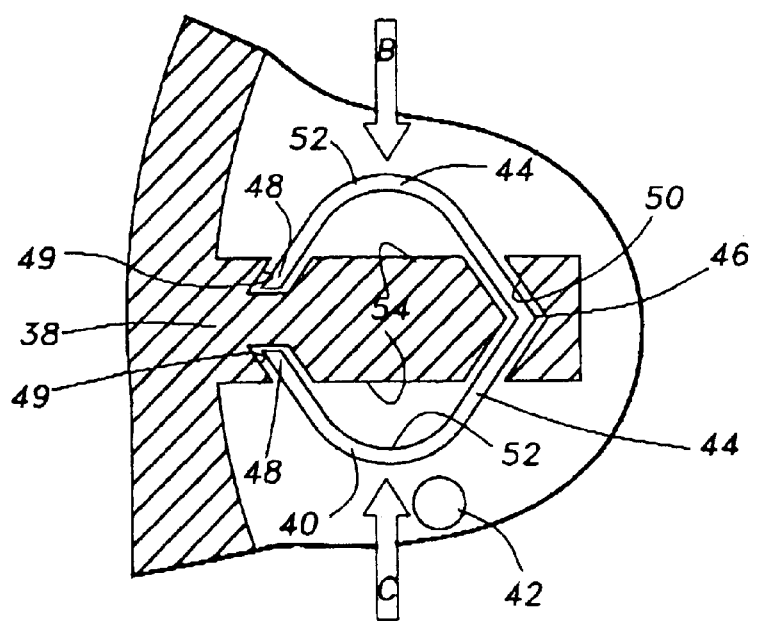
FIG. 3 is a cross-sectional view through the housing and worm gear of the present invention.

As shown in FIG. 3, the housing 36 includes a generally U-shaped spring 40 received within stop surface 38. The spring 40 includes sides 44 connected at an apex 46. Remote ends 48 are also received in the stop surface 38. As shown, a first generally V-shaped channel 50 receives the apex 46 and extends towards the sides 44. A second channel portion 49 is formed in the stop surface 38 and receives the remote ends 48.

Ears 52 of the spring 40 extend outwardly away from a sidewall 54 of the stop surface 38. Now, as the stop 42 approaches its extreme of travel, it begins to contact the ear 52 as shown in FIG. 2. The spring ear 52 begins to be compressed towards the sidewall 54, however a resistance is also created to further movement of the stop 40. Spring ear 52 thus provides a cushion preventing the stop 42 from being wedged into the surface of the stop surface 38, thereby locking the worm gear. The inventive use of the spring provides a cushion that allows the stop 42 to approach its ends of travel without damage to the overall transmission or actuator system 20.

Figure 4:
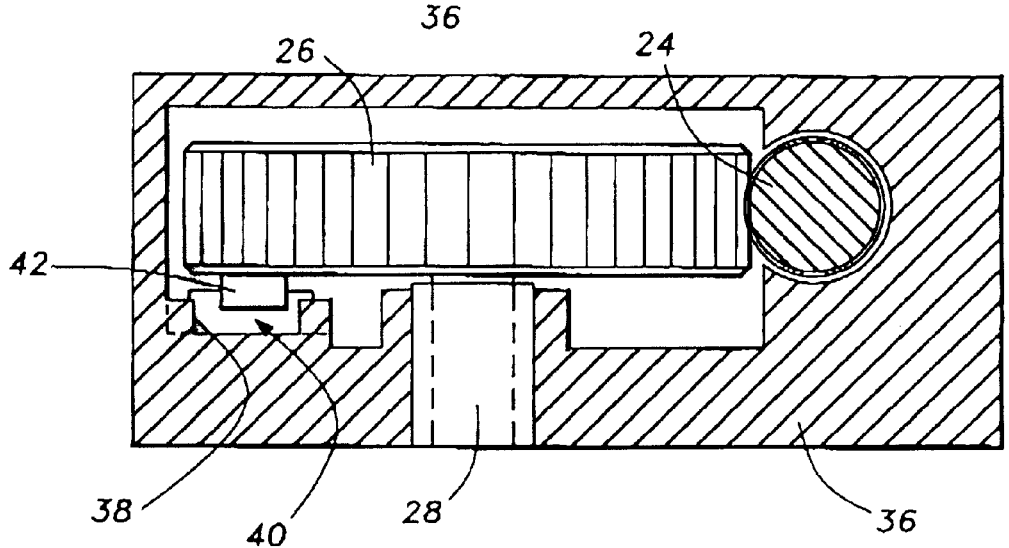
FIG. 4 is an enlarged view of a portion of the housing illustrated in FIG. 2.

As shown in FIG. 4, spring 40 and stop 42 are sized such that the stop 42 will contact spring 40. As set forth in the other figures, once stop 42 begins to contact spring 40, resistance to further rotation is applied by the spring 40.

In a method of operating a transfer case actuator according to this present invention, a cushion is provided to cushion movement of a stop member on a worm gear as that worm gear approaches its extreme travel range. The cushion is preferably a spring member, as described above. During operation of the system, the stop will typically not approach its extreme travel range, however when it does the stop encounters the cushion against further movement of the stop.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A motor and transmission assembly comprising:

a reversible electric motor driving a worm having a thread;

a worm gear having gear teeth engaged with said thread on said worm, a stop selectively engaging a stop surface preventing rotation of said worm gear beyond two ends circumferentially spaced by less than 360°; and a cushion for cushioning said stop as said stop approaches said stop surface at said ends.

2. An assembly as recited in claim 1, wherein said cushion is provided by a spring which is contacted by said stop as said stop approaches said ends.

3. An assembly as recited in claim 2, wherein spring cushions are disposed at opposed circumferential locations and associated with each of said ends.

4. An assembly as recited in claim 3, wherein a single spring provides both cushions.

5. An assembly as recited in claim 4, wherein said spring is received in a stop surface which extends from said surface of a housing which mounts said worm gear.

6. An assembly as recited in claim 5, wherein said stop surface includes a channel receiving an apex of said spring, said spring cushions defined by opposed ears extending from said apex.

7. An assembly as recited in claim 6, wherein said ears extend away from sidewalls of said surface for providing said cushions.

8. An assembly as recited in claim 1, wherein a position feedback member monitors the position of said worm gear.

9. An actuator for a transfer case of a vehicle comprising:

a motor for driving a first gear, said first gear engaging a second gear and being driven by said first gear;

a shaft being driven by said second gear, said shaft moving an actuator for a transfer case of a vehicle, the rotational position of said shaft causing movement of said actuator to achieve a selected mode of operation for a transfer case;

said second gear being prevented from rotating 360°, and having a range of travel with two circumferential end spaced by less than 360°, a stop provided on said second gear member to prevent movement beyond said ends; and a cushion to be contacted by said stop as said stop approaches each of said ends, and providing a cushion for said stop.

10. An actuator as recited in claim 9, wherein said cushion is provided by a spring which is contacted by said stop as said stop approaches said ends.

11. An actuator as recited in claim 10, wherein spring cushions are disposed at opposed circumferential locations and associated with each of said ends.

12. An actuator as recited in claim 11, wherein a single spring provides both said cushions.

13. An actuator as recited in claim 12, wherein said spring is received in a stop surface extending from a surface of a housing which mounts said second gear.

14. An actuator as recited in claim 13, wherein said stop surface includes a channel receiving an apex of said spring, said spring cushions defined by opposed ears from said spring and extending from said apex.

15. An actuator as recited in claim 14, wherein said ears extending away from sidewalls of said surface for providing said cushion.

16. An actuator as recited in claim 9, wherein there is a groove in said shaft and said actuator is a pin which moves within said groove between a plurality of axial positions to achieve said selected mode of operation for said transfer case.

17. An actuator as recited in claim 9, wherein said first gear is a worm and said second gear is a worm gear.

18. An actuator as recited in claim 9, wherein a position feedback member is disposed for monitoring the position of said second gear.

19. A method of operating an actuator for a vehicle transfer case comprising the steps of:

(1) providing a motor driving a first gear, said first gear engaging a second gear, said second gear driving a shaft, said shaft controlling movement of an actuator pin to move a vehicle transfer case between positions providing two- or four-wheel drive for a vehicle;

(2) operating said motor to drive said second gear to move said actuator pin to desired positions, the rotation of said second gear being limited to a range of less than 360°; and (3) providing a spring cushion to cushion movement of said second gear as it approaches the end of its range of travel.

20. A method as recited in claim 19, wherein said cushion is provided by a spring.

* * * * *